Feb. 21, 1950     T. L. HANCOCK ET AL     2,498,620
SAFETY DRIVING LIGHT MOUNTING
Filed March 4, 1947
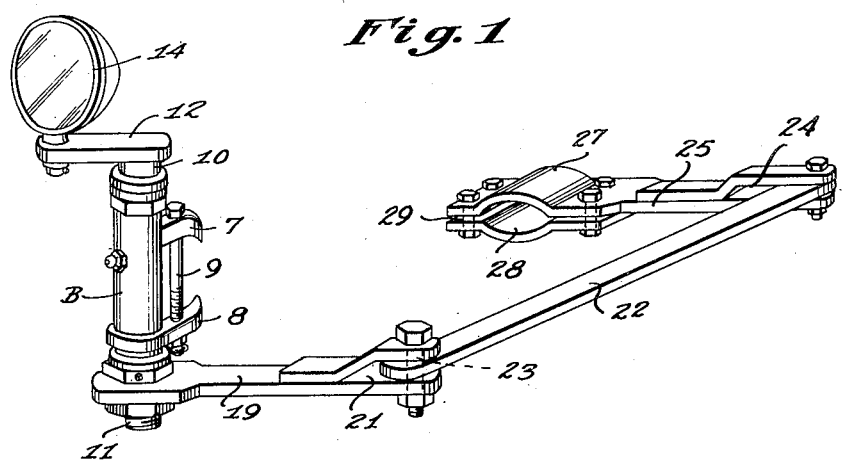
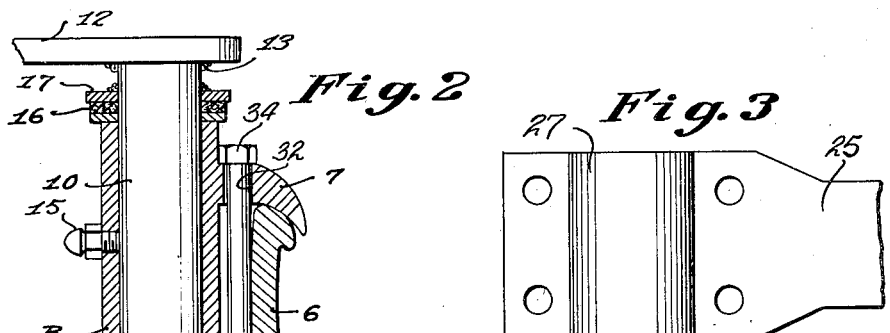
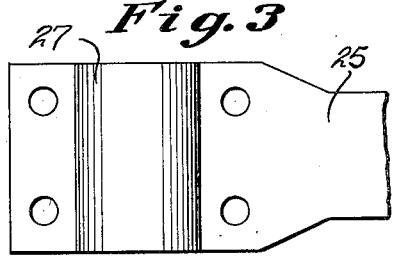
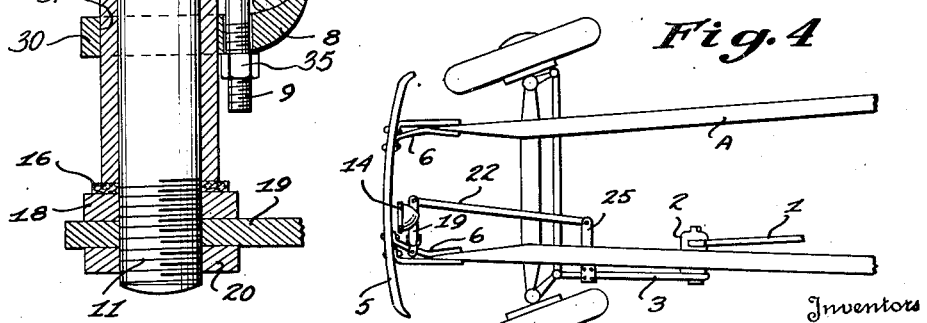
Inventors
THAD L. HANCOCK AND
HESTER K. HANCOCK Patented Feb. 21, 1950

2,498,620

UNITED STATES PATENT OFFICE 2,498,620

SAFETY DRIVING LIGHT MOUNTING

Thad L. Hancock and Hester K. Hancock,
La Marque, Tex.

Application March 4, 1947, Serial No. 732,219

1 Claim. (Cl. 248—226)

The invention relates to a new and improved construction and mounting for automobile head lamps of which the following is a specification.

The primary object of this invention resides in the provision of an automobile head lamp which is so constructed and so mounted as to adapt said lamp to be turned incidentally with the wheels of the vehicle to illuminate that area into which an automobile is turning rather than the area directly ahead of the vehicle.

Another object of this invention is the provision of light construction of the character described which is adapted to be operated from the steering arm of an automobile, and which may be quickly and easily mounted on any vehicle as a utility light to be used only when the automobile is traveling on crooked roads or the like or for use as a turning light for parking in restricted areas to one side of the direction of travel of the vehicle.

Still a further object of this invention resides in the provision of a lamp of the character set forth which is so constructed and mounted as to be securely maintained in place at all times and which is provided with proper bearings and like construction to prevent the formation of stresses and strains in the parts of said lamp.

Another and still further object of this invention is the provision of a device of the character described which is of a simple, durable and inexpensive design and construction, and which is easily applied to an automobile and reliably automatically operated thereby.

Still further improvements and advantages of this invention will readily appear to those skilled in the art when the following description is read in the light of the accompanying drawings in which:

Fig. 1 is a perspective view of the assembled lamp and mounting.

Fig. 2 is a vertical section of the lamp bearing and mounting.

Fig. 3 is a plan view of one clamping plate.

Fig. 4 is a top plan view of the lamp mounted in place on the auto.

Referring now to the accompanying drawings which illustrate the preferred embodiment of this invention and in which like numerals indicate similar parts throughout A designates the body frame of an automobile carrying in conjunction therewith the conventional parts including among them the steering shaft 1 from the wheel operating the steering gear 2, and said gear operates the steering rod 3 which acts to turn the wheels 4 of the vehicle. A bumper 5 is secured to each forward end of the frame by the bumper arms 6.

A tubular lamp support B in the form of an elongated, cylindrical housing, is rigidly attached to a fixed member of the automobile, such as the flat bumper arm 6, and rotatably receives a cylindrical, lamp-carrying stud 10. The support B is provided intermediate its length with an outwardly-extending, curved and tapered clamping arm 7 shaped to hook over one edge of the bumper arm, as shown in Figure 2. In the illustrated arrangement arm 7 is disposed near the upper end of housing B and hooks downwardly over the top edge of bumper arm 6 when the housing is in operative position relative to the bumper arm. A flat ring 30 has a circular aperture 31 therein slidably receiving the housing B between arm 7 and the opposite end of the housing, and an outwardly-extending, curved and tapered clamping arm 8. In the illustrated arrangement, ring 30 is slidably received on the housing B below arm 7 and arm 8 hooks over the bottom edge of bumper arm 6 in opposition to arm 7. Clamping arms 7 and 8 are provided with respective apertures 32 and 33 near housing B and a bolt 9 having on one end a head 34 and external screw threads on its opposite end extends through these apertures in the clamping arms and a nut 35 threaded on the bolt urges the clamping arms together to firmly clamp the bumper arm therebetween. Bolt 9 is wedged against one side of the bumper arm by the curved clamping arms 7 and 8 to firmly support the housing B thereon against twisting or tilting movements.

The elongated cylindrical stud 10 threaded at one end as at 11, is rotatably mounted in said housing with the threaded end 11 extending therebeneath and a horizontal flat arm 12 welded at 13 to the upper end thereof to extend outwardly to terminate at a spaced distance from the upper end of said stud where a conventional type dirigible or spot lamp 14 is vertically secured thereabove.

A grease fitting 15 is provided on said housing and opens thereinto and grease type gaskets 16 are provided at each end thereof about the stud 10 and are locked in place by a welded cap plate 17 at the upper end and a nut 18 threaded about the stud 10 at the lower end.

An arm 19, provided with an aperture in one end, is received about the lower threaded end of stud 10 beneath the nut 18 and is locked in place thereagainst by a lock nut 20 locking said arm with said stud and adapting it for rotation therewith. The second end of the arm 19 is provided with a bifurcation 21 adapted to receive one end of an elongated flat arm 22 therein which is pivotally secured in such a position on a stud 23 extended and locked therethrough adapting it to pivotally actuate the arm 19.

The second end of the elongated arm 22 is pivotally received in the bifurcated end 24 of a second short arm 25 which carries one half of a clamp which comprises two concave plates 27 and 28 interconnected by studs 29 adapting them to clamp a bar, rod or the like therebetween.

In mounting the described construction on a vehicle, the housing is secured to the bumper arm as described and the elongated arm is pivoted rearwardly where the complementary clamping pieces are secured about the steering arm 3.

Thus in operation movement of the steering arm in one direction will cause movement through the arm 22 to the arm 19 which when it pivots will cause rotation of the stud 10 in the housing B, and thus pivotation of the arm 12 and lamp 14 so that the lamp will shine in the direction in which the wheels are turning to illuminate that area not lighted by the headlights of the car into which the car is turning.

Complementary action of the arms will cause the lamp to turn in whatever direction the wheels are turned hence making the use of one lamp sufficient for any one automobile.

Having thus described and explained this invention and with full belief that modifications in size, materials and general characteristics would not constitute a departure from the spirit of this invention what we desire to claim in Letters Patent is:

Means for securing a lamp to a flat supporting arm comprising an elongated, tubular housing for rotatably receiving a lamp-carrying stud, a curved and tapered clamping arm extending outwardly from said housing near one end of the latter to hook over one edge of the flat supporting arm, a ring slidably received on said housing between said clamping arm and the opposite end of said housing, a curved and tapered clamping arm extending outwardly from said ring to hook over the opposite edge of said supporting arm in opposition to said first-mentioned clamping arm, said clamping arms having respective apertures therethrough adjacent said housing, a threaded bolt extending through said clamping arm apertures, and a nut threaded on said bolt to force said clamping arms into clamping engagement with the opposite edges of said supporting arm and wedge said bolt against the adjacent side of the supporting arm.

THAD L. HANCOCK.
HESTER K. HANCOCK.

REFERENCES CITED

The following references are of record in the file of this patent:

UNITED STATES PATENTS

| Number | Name | Date |
|---|---|---|
| 1,116,499 | Schuyler | Nov. 10, 1914 |
| 1,351,299 | Meeks | Aug. 31, 1920 |
| 1,522,705 | Wagner et al. | Jan. 13, 1925 |
| 1,533,424 | Johnstone et al. | Apr. 14, 1925 |
| 1,545,283 | Schuhbauer et al. | July 7, 1925 |
| 1,704,615 | Johnston | Mar. 5, 1929 |
| 1,762,536 | Van Etten | June 10, 1930 |
| 1,821,220 | Krick | Sept. 1, 1931 |